April 18, 1933.  C. G. KRUCKEMEYER  1,904,376
GANG MOWER
Filed June 9, 1930    2 Sheets-Sheet 1

Inventor:
Charles G. Kruckemeyer,
By Rippey & Kingsland.
His Attorneys.

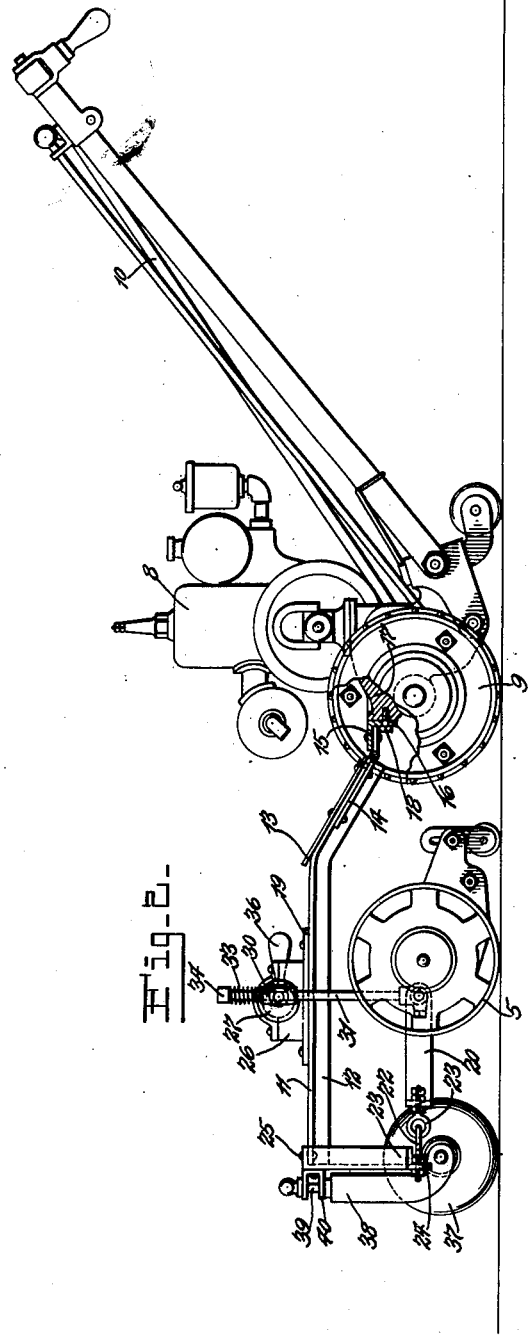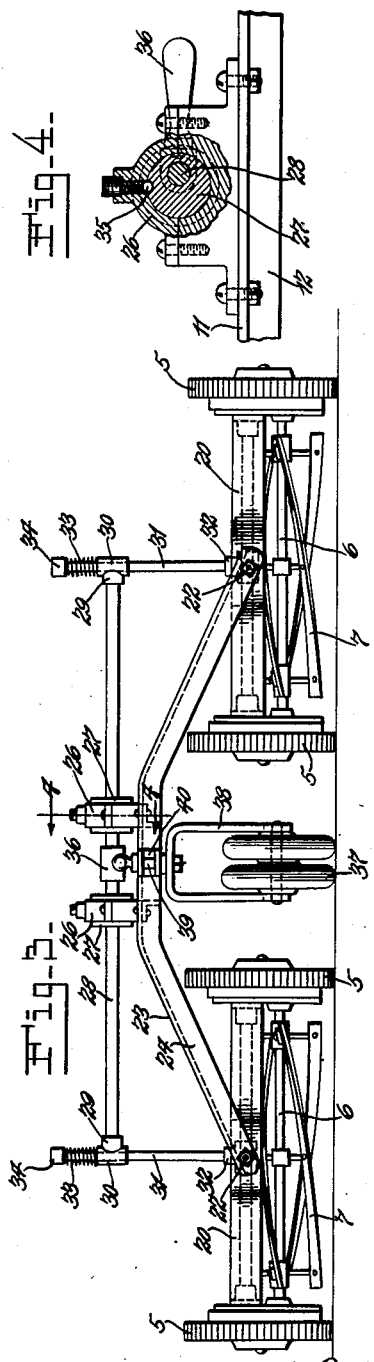

Patented Apr. 18, 1933

1,904,376

UNITED STATES PATENT OFFICE

CHARLES G. KRUCKEMEYER, OF JENNINGS, MISSOURI

GANG-MOWER

Application filed June 9, 1930. Serial No. 460,039.

This invention relates to gang-mowers, and has special reference to means for operating lawn mowers in gangs.

An object of the invention is to provide an improved mechanism or structure designed and adapted for use as an operating connection, whereby a number of lawn mowers may be operated by a motor driven vehicle.

Another object of the invention is to provide improved means for operating a number of lawn mowers of usual and familiar construction by a motor driven vehicle.

Other objects will appear from the following description, reference being made to the accompanying drawings, in which—

Fig. 2 is a side elevation with parts in section.

Fig. 3 is a front elevation.

Fig. 4 is a vertical sectional view on the line 4—4 of Fig. 3.

Figure 1:
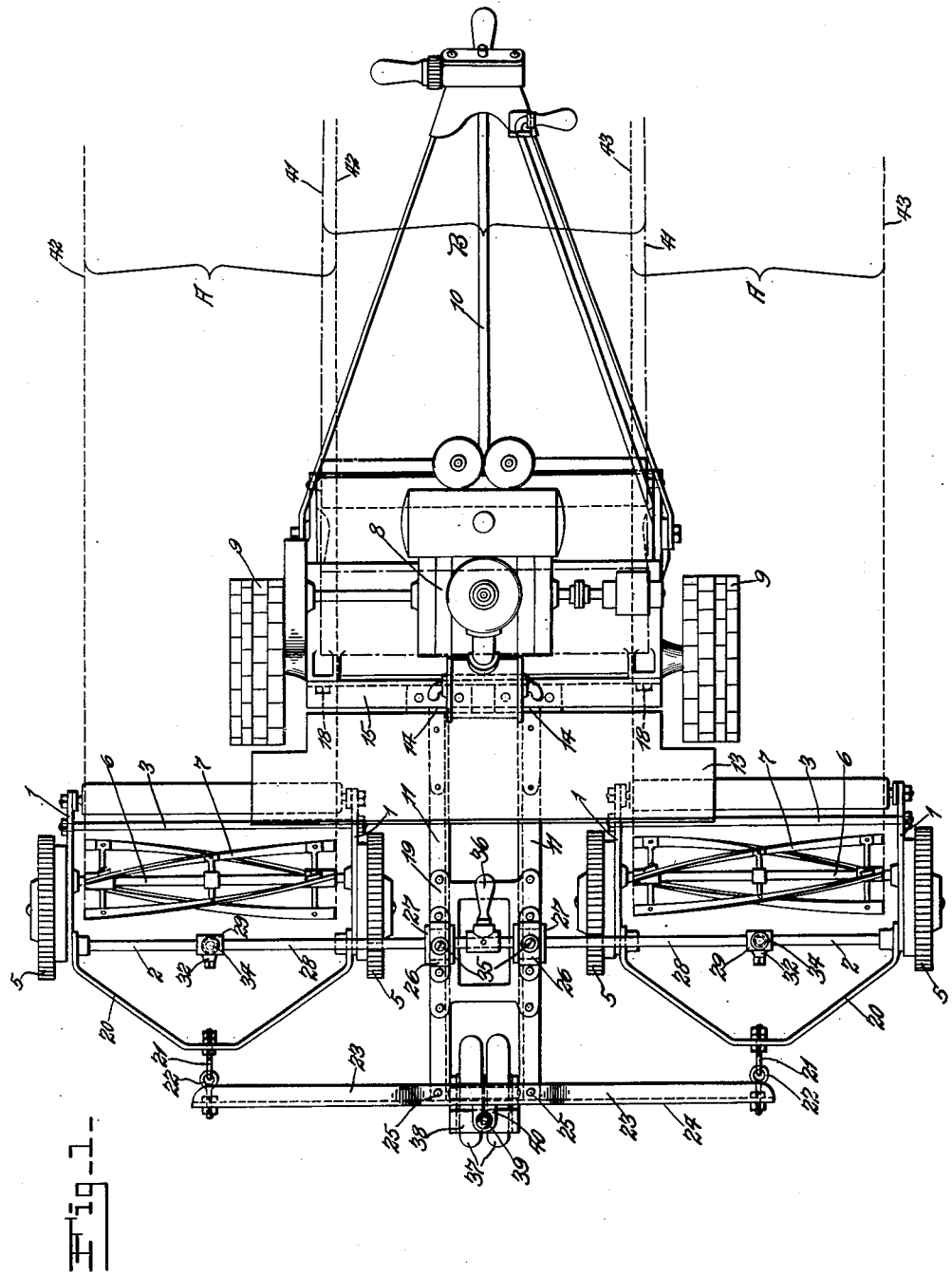
Fig. 1 is a plan view showing the invention connected with a number of lawn mowers and a motor driven vehicle for operating the mowers by the vehicle.

In the drawings, I have shown two lawn mowers of usual and familiar construction, each comprising frame side members 1 connected at their front by a shaft 2 and at their rear by a rod 3 in order to provide a rigid frame for each mower. The frames are supported by the usual wheels 5 geared in the usual way with shafts 6, so that the said shafts 6 will be rotated automatically and as an incident to the forward movement of the mowers. Each of the shafts 6 supports a reel of blades 7 which are the mower blades. All of these parts are of the usual construction and mode of operation, every one familiar with such machines knowing the manner in which the grass and other vegetation are cut by the blades 7 during travel of the mowers.

The present invention comprises mechanism for operating a number of these lawn mowers as a gang. For operating the gang of mowers, I use a motor driven vehicle of familiar construction, comprising a motor 8 which, in operation, rotates the traction wheels 9 in order to propel the vehicle. The usual clutch operating connections 10 are included in this motor driven vehicle so that the vehicle may be propelled or not when the motor is running.

A pair of angle bars are assembled in a manner to provide a frame. Each of these angle bars has an upper horizontal portion 11 and a depending portion 12. The rear end of each angle bar, comprising the flanges 11 and 12, is bent downwardly and constitutes a support for an inclined plate 13 constituting a dash or guard to prevent the grass and other substances from being thrown upwardly onto the motor during operation of the machine. The flange 11 of the downwardly deflected portion of each of these bars is attached to one part of a hinge 14. The other parts of these hinges 14 are attached to the forwardly extending flange 15 of a transverse angle bar. The depending flange 16 of this angle bar is attached to the motor frame 17 by detachable bolts or screws 18 which pass through the flange 16 and anchor in the frame 17.

The upper portions of the angle bars are rigidly connected by a frame member 19 so that relative movement of said angle bars is prevented.

A yoke 20 has its ends connected with the shaft 2 of each lawn mower. A coupling member 21 is attached to the forward intermediate portion of each yoke 20 and said coupling members 21 are pivoted to cooperating coupling members 22 attached to the outer ends of an operating yoke. The operating yoke consists of an angle bar having an upper flange 23 seated upon the forward ends of the angle bars, comprising the flanges 11 and 12, and a depending flange 24. This yoke bar is rigidly attached to the frame bars by fasteners 25. The ends of this yoke bar are deflected downwardly so that the coupling members 22 are supported in proper position for pivotal engagement with the coupling members 21.

The frame member 19 supports a pair of bearings 26 in each of which a member 27 is mounted for turning movements. A shaft 28 extends eccentrically through the members 27 and is attached thereto, so that turning of said shaft 28 will turn both the members 27. The outer ends of the shaft 28 extend into sockets 29 formed integral with vertical sleeves 30. Rods 31 project for vertical sliding movements through the rspective sleeves 30 and, at their lower ends, are equipped with fittings 32 rigidly attached to the shafts 2. A strong coil spring 33 encircles the upper portion of each of the rods 31, the lower ends of said springs 33 bearing upon the sleeves 30 and their upper ends bearing against heads 34 attached to the upper ends of the rods 31. These springs are normally under compression and their tension may be increased by turning the shaft 28, and thereby the members 27.

A latch device 35 of familiar construction is mounted in each of the bearings 26 for engagement with the adjacent member 27, so as to hold said members 27 in the position they occupy when the machine is in operation. One of these latch devices is shown in Fig. 4.

A handle 36 is attached to the shaft 28 between the bearings 26 and is operative to turn the shaft 28 from one position to another in order to vary the tension of the springs 33.

A supporting device for the front end of the frame is provided, the same comprising a wheel member 37 rotatably journalled in a frame 38 and connected with a swivel member 39 mounted for turning movements in a bracket 40 attached to the operating yoke.

In operation of this machine, the motor 8 is running and the clutch operating connection 10 is operated to control the operation of the motor vehicle by the motor. The hinges 14 permit the lawn mowers to rise and fall as they pass over irregularities along the ground without straining any of the frame parts. The pivotally connected coupling members 21 and 22 and the connections 30—31 also permit variations in the positions of the mowers to compensate for any ground irregularities. The guard 13 prevents the grass and other vegetation and articles from being thrown upon the motor vehicle by the mowers.

The motor vehicle shown is a lawn mower and the mower reel thereof cuts a strip or swath the width of the space between the lines 41. From the preceding description, it will be seen that I have provided mechanism for connecting up a pair of additional lawn mowers with this motor driven lawn mower, so as to cut strips or swaths at the sides of the strip or swath cut by the usual motor driven mower. My invention comprises means for connecting up and arranging and operating these additional lawn mowers in such a way that the strips or swaths cut thereby lap the strip or swath cut by the usual motor driven mower between the lines 41. This will be apparent by reference to Fig. 1 of the drawings, in which it will be seen that one of the additional lawn mowers cuts a strip or swath as wide as the space between the lines 42, and the other additional lawn mower cuts a strip or swath as wide as the space between the lines 43. The inner marginal edges of the strips or swaths A between the lines 42 and the lines 43, respectively, overlap the outer marginal edges of the strip or swath B between the lines 41. This is because the combined length of the several mowers is greater than the distance between the outer line 42 and the outer line 43, and because the inner ends of the respective reels 7 are inwardly beyond the planes of the outer ends of the reel that cuts the swaths B. Thus, the inner edges A overlap the outer edges of the strips or swaths B, effectively preventing the leaving of any uncut grass or vegetation. Accordingly, it is necessary to operate my improved gang mower only once over the field in order to make a clean cut of the entire surface.

It is now clear that I have provided improved means for operating gangs of lawn mowers of usual and familiar construction. The device comprising this invention may be made and sold at comparatively low cost, is of strong and durable construction, and is free from complicated devices. The construction and arrangement of the parts may be varied widely from that specifically shown and described without departure from the nature and principle of the invention. I do not restrict myself in any unessential particulars, but what I claim and desire to secure by Letters Patent is:—

1. A device of the character described comprising a frame of rigid construction, a rock shaft supported by said frame, sliding rods in connection with the ends of said rock shaft, means connecting the lower ends of said rods with lawn mowers, means connecting the forward end of said frame with said lawn mowers, and means for connecting the rear end of said frame with a motor vehicle.

2. A device of the character described comprising a frame of rigid construction, a transverse yoke rigid with the forward end of said frame, a supporting wheel for the forward end of said frame, hinges attached to the rear end of said frame, a bar attached to said hinges, and means for attaching said bar to the frame of a motor vehicle.

3. A device of the character described comprising a frame, an operating yoke attached to and extending transversely across the forward end of said frame, means for pivotally connecting said yoke with a number of axially alined spaced lawn mowers, a shaft supported transversely of said frame, means for yieldingly connecting said shaft with the respective lawn mowers, and hinges connecting the rear end of said frame with a motor vehicle rearwardly of said lawn mowers.

4. A device of the character described comprising a frame, an operating yoke extending transversely of and rigidly secured to the front end of said frame, a wheel supporting the front end of said frame, means for pivotally connecting said yoke with a number of spaced axially alined lawn mowers, an element supported by and extending transversely of said frame, members for connecting said element with said respective lawn mowers, and means pivotally connecting the rear end of said frame with a motor vehicle rearwardly of said lawn mowers.

5. The combination with a lawn mower for cutting a strip of a definite width, and power mechanism for operating said lawn mower, of a frame having its rear end hinged to and supported by said power mechanism, a wheel supporting the front end of said frame in advance of said power mechanism, an operating yoke in connection with the forward end of said frame beyond the front of said power mechanism, means for pivotally connecting said yoke with a number of additional spaced axially alined lawn mowers in a relationship in which said additional lawn mowers operate to cut strips overlapping the sides of the strip cut by said first lawn mower, a rock shaft supported by said frame, and yielding connections between said rock shaft and said respective additional lawn mowers.

6. The combination with a lawn mower for cutting a strip of a definite width, and power mechanism for operating said lawn mower, of a frame extending forwardly from said power mechanism and having its rear end hinged thereto, a number of additional spaced axially alined lawn mowers forwardly from said first lawn mower in a relationship to operate to cut strips overlapping the sides of the strip cut by said first lawn mower, means connecting said frame with said additional lawn mowers, an operating yoke attached to the front end of said frame, operating connections between said yoke and said respective additional lawn mowers, and a wheel supporting the front end of said frame.

7. A device of the character described comprising a frame, an operating yoke in connection with the forward end of said frame, means for pivotally connecting said operating yoke with a number of spaced lawn mowers, vertical rods supported by said frame and connected with corresponding lawn mowers, and yielding means supporting said rods for vertical movements.

8. A device of the character described comprising a frame, a motor vehicle, hinges connecting the rear end of said frame with said motor vehicle, a wheel supporting the front end of said frame, an operating yoke in connection with the front end of said frame, means for pivotally connecting said operating yoke with a number of lawn mowers located in advance of said motor vehicle and rearwardly from said wheel, and means other than said pivotal means for yieldingly connecting said frame with each of said lawn mowers.

9. A device of the character described comprising a frame of rigid construction, a wheel supporting the front end of said frame, a motor mechanism for propelling said frame, hinges connecting the rear end of said frame with said motor mechanism, an operating yoke supported by the front end of said frame, means for pivotally connecting said operating yoke with a number of lawn mowers, a rock shaft supported by said frame, downwardly extending rods supported by said rock shaft, and means for connecting the lower ends of said rods with said lawn mowers.

10. A device of the character described comprising a frame of rigid construction, a rock shaft, means supported by said frame for raising and lowering said rock shaft, downwardly extended rods supported by said rock shaft, a yoke supported by said frame, means for pivotally connecting said yoke with a number of lawn mowers, and means for connecting the lower ends of said rods with said lawn mowers.

11. A device of the character described comprising a frame of rigid construction, a shaft extending transversely of said frame, means supported by said frame for raising and lowering said shaft with respect to said frame, means for pivotally connecting a number of lawn mowers with the front end of said frame, and connections for connecting said shaft with the respective lawn mowers.

12. A device of the character described comprising a frame of rigid construction, means for pivotally connecting a number of lawn mowers with said frame, a shaft extending transversely of said frame, devices supported by said frame for raising and lowering said shaft with respect to said frame, downwardly extended rods, means for supporting said rods for vertical sliding movements in connection with said shaft, and means for connecting the lower ends of said rods with said lawn mowers.

CHARLES G. KRUCKEMEYER.